United States Patent Office 3,554,582
Patented Jan. 12, 1971

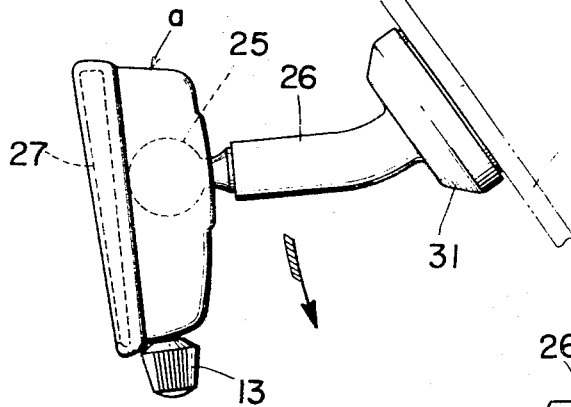
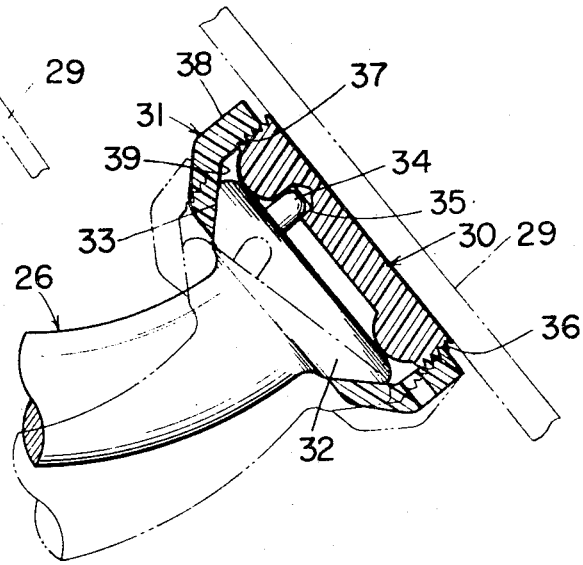
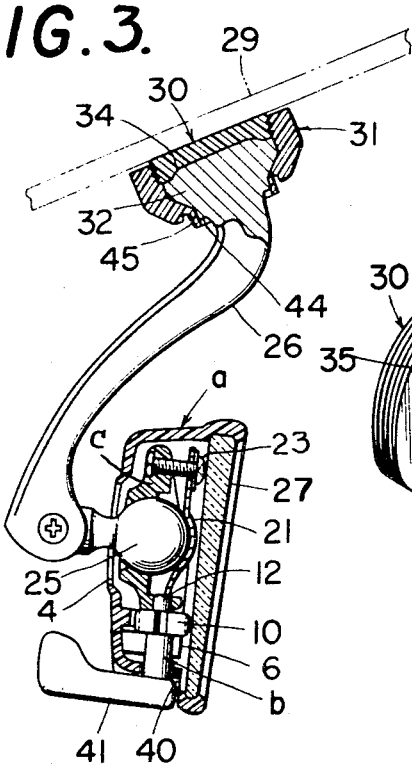
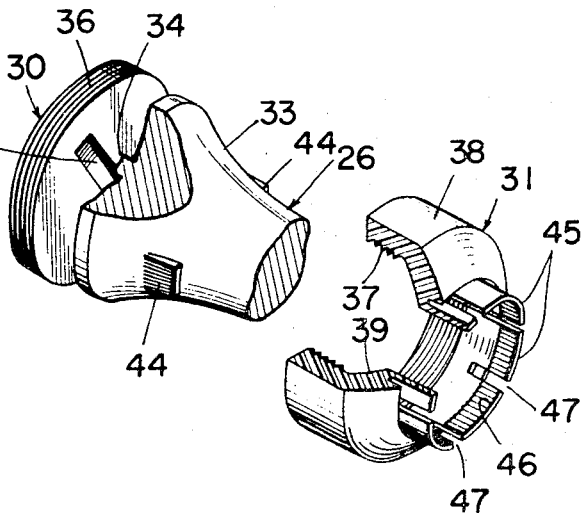

3,554,582
SAFETY FITTING ATTACHMENT ASSEMBLY EMBODYING COMPONENTS WITH DISTORTABLE THREAD MEANS
Makoto Yamashita, Isehara-machi, Kanagawa-ken, and Masagoro, Kushida, Tokyo, Japan, assignors to Kabushiki Kaisha Ichikawa Seisakusho, Tokyo, Japan
Original application Feb. 26, 1968, Ser. No. 708,315, now Patent No. 3,507,562, dated Apr. 21, 1970. Divided and this application Jan. 21, 1969, Ser. No. 839,097
Claims priority, application Japan, Feb. 28, 1967, 42/16,699; Mar. 10, 1967, 42/19,695
Int. Cl. F16b 29/00; B60r 1/04
U.S. Cl. 287—20.5                3 Claims

ABSTRACT OF THE DISCLOSURE

An improved safety fitting attachment assembly for detachably mounting various fittings, such as rear view mirrors in automobiles, which fitting assembly is capable of absorbing impacts and permitting the fitting to become disloded or separated from its mounting or support when subjected to relatively intense impacts of a predetermined stress value. This is achieved by providing a male-threaded relatively flat cylindrical base for attachment, as by a suitable adhesive to a support surface, and further providing an annular complementally threaded collar which fits over and complementally cooperates with a base flange portion of a fitting or mounting stay member to hold the stay onto the mounted cylindrical base. The complemental threaded portions being of a relative size and character with at least one of them being fabricated of a plastic material to permit a nonrotative generally axial or oblique separation thereof responsive to an application of a predetermined force thereagainst, as a safety precaution to preclude injury as by personal engagement against an otherwise normally or relatively immovable object. The cylindrical base and flange of the mounting stay may have complemental interengaging means to positively orient and preclude relative rotative movement of the base and flange when held in fully assembled condition by said collar; and may further include complemental cooperating means such as straight knurled portions on the flange of the mounting stay and on a portion of said collar to effect a locking action to preclude inadvertant unscrewing of the assembled fitting components.

This application is a division of applicants' parent application Ser. No. 708,315, filed Feb. 26, 1968, now issued Pat. No. 3,507,562, Apr. 21, 1970.

This invention relates to a fitting attachment assembly capable of detachably attaching a variety of items, but more preferably for attaching rear view mirrors in automobiles to a supporting surface.

A main object of this invention is to provide a safety mounting, such as for use in mounting automobile rear view mirrors which may be efficiently and easily produced by utilizing the technique of unit molding, limiting the number of parts to a minimum.

Another object of this invention is to provide an improved mounting for rear view mirrors and other objects with a high safety factor by preventing hazards of impact, as when a vehicle stops abruptly, or other reasons, causes the passenger to fall forward and bump against the mirror, whereupon by use of this improved fitting attachment assembly, when the impact shock reaches a predetermined limit, the rear view mirror dislodged by means of its special safety attachment fitting.

These together with other objects and advantages which subsequently will become more apparent reside in the details of construction and operation as more fully hereinafter described and claimed, reference being had to the accompanying drawings forming a part thereof, wherein like numerals refer to like parts throughout, and in which:

FIG. 1 is a side view of a basic example, showing a fitting construction in association with a rear view mirror and including the mounting stay, taking into account the safety against shock;

FIG. 2 is an enlarged view partly in vertical cross-section and partly in a side elevation view of a part of the fitting base of the stay;

FIG. 3 is a composite vertical cross-sectional and side elevational view of the rear view mirror showing another embodiment; and FIG. 4 is a disassembled perspective view partly in cross-section, showing the fitting and fixing construction of the stay of the same FIG. 3 embodiment.

A form of rear view mirror as might be mounted in association with this invention is disclosed in more detail in applicants' U.S. Pat. No. 3,507,562, issued Apr. 21, 1970.

The usual construction and mounting of rear view mirrors fixes the support stay 26 inside the driver's compartment, but as shown in FIGS. 1 and 2, the construction is such that the mirror is readily displaceable when subjected to a predetermined shock, thereby providing a much safer and potentially less dangerous installation.

Namely, the fitting assembly depicted in FIGS. 1 and 2 shows the placing of the stay 26 holding a rear view mirror box $a$ to a base material 30 adhered to a front support or window glass 29, which stay and box are mounted with the aid of a cap 31, molded from acetal resin and ABS resin, a variety of synthetic resins having a bending and elasticity rate of 200,000 to 1,000,000 p.s.i. The foregoing such synthetics normally have a Rockwell hardness R scale of about 50 to 130. Furthermore, the foregoing synthetic resin includes synthetic resins other than acetal resin or ABS resin, which have been made with the same bending and elasticity by mixing the appropriate materials. It is understood by those skilled in the art that ABS resin is indicative of a synthetic resin which is made by copolymerization of acrylonitrile, butadiene and styrene.

A taper surface 33 is provided on a base 32 of the stay member 26, and also a small boss 34 for correct orientation is provided on the bottom surface of the base 32. The base member 30 adhered preferably to the front side glass 29 is, for instance, a flat disc like shaped light-weight alloy product having a concave part 35 which complementally receives the foregoing small boss. A male screw thread 36 is provided on the outer periphery of the base 30. The material of the cap 31 is generally the same as the foregoing, and is provided with an annular wall 38 with a female screw thread 37 formed inside the cooperate with male thread 36. The cap further includes a reversely complementally tapering wall 39 which gradually decreases the diameter of said annular wall 38. The inside of the taper wall 39 is angled so as to correspond to the angle of taper surface 33 of the base section of the foregoing stay.

In this illustrative way, the base member 30 is adhered to the front window glass. Aligned with this base member is the base section 32 which is formed with the taper of the stay, and by means of the overlying cap 31 being screwed onto the base member 30, the stay can be fixed in a predetermined position by complemental clamping action of the respective taper surfaces or portions 33 and 39. However, when an impact shock is applied from the front side of the mirror box, a force as shown with an arrow mark in FIG. 1 acts on the stay 26 and this force is transmitted to the cap 31 through the medium of the base section 32. Therefore, the annular wall 38 of the cap 31 is elastically deformed performing a buffer action, and when it reaches a predetermined degree, the binding of said annular wall 38 and base member 30 resolves and the cap 31 and stay 26 are forced away from the base member 30, as shown in broken outline in FIG. 2.

Therefore, in the case of an accident where the driver's head or other parts of the body bumps against the mirror, the stay 26 drops together with the cap 31 from the base member 30 fixed on the front window glass 29 when a predetermined impact force is exceeded. Accordingly, shock can be eased when the head or the body bumps against the mirror and the danger of receiving injuries is greatly lessened, keeping injuries to a minimum, since after the mirror section drops, only the flat base member 30 remains.

The fitting construction of the FIGS. 3 and 4 embodiment is basically identical to the foregoing ones for FIGS. 1 and 2. However, a cap locking feature is annexed to it. That is, in FIGS. 3 and 4, the projection 44 having an uneven outer surface, such as straight knurling, is formed a little above the taper surface 33 of the base section of the stay 26, and cap 31 is provided with a thin interrupted cylindrical section 45 connected to the upper part of the taper wall 39. The inside of the said cylinder section is provided with the complementary knurling 46 to mate with 44, and is further provided with a plurality of slots 47 made at regular intervals as needed. When the cap 31 is rotatively screwed onto the base member 31, it is apparent that the interaction of the knurled projection 44 and the knurling of the cylindrical section 45 effects a lock to assure that the cap does not inadvertantly loosen.

From the foregoing various embodiments, it is apparent that a greatly improved safety fitting attachment assembly means has been evolved which satisfies the objectives and provides the advantages, as set forth in the preamble and throughout the specification.

While illustrative embodiments have been shown and described, other variations may be made by one skilled in the art without departing from the spirit of the invention and the scope thereof as defined in the appended claims.

What is claimed is:

1. A fitting attachment assembly for detachably mounting various fittings, said assembly comprising:
    (a) a cylindrical base having one flat surface for engageable attachment with the support surface, and having male peripheral threads;
    (b) a tapered flange on the end of a mounting stay for engagement with the cylindrical base surface opposite that attached to the support surface, said tapered flange being of a circumferential size not in excess of the male threads root diameter;
    (c) an annular collar or cap member having complemental female threads at one end for cooperation with the male threads and a complemental tapered holding portion at the opposite end, to engagingly overlay and retain the tapered flange of said stay, said male and female threads being of a relative size and character with at least one of them being of plastic material and deformable to enable nonrotative separation thereof responsive to application of a predetermined force thereagainst as a safety precaution to preclude injury by personal engagement against an otherwise relatively immovable object; and
    (d) said cylindrical base and said tapered flange having complemental interengaging means to positively orient and to preclude relative rotative movement of the base and flange when held in fully assembled condition by said collar.

2. An attachment fitting assembly as defined in claim 1 wherein the cap member is of molded synthetic resin plastic material having a bending and elasticity rate of from 200,000 to 1,000,000 p.s.i.

3. An attachment fitting assembly as defined in claim 1 wherein the tapered flange of the mounting stay is provided with at least partially knurled shoulder areas on separated parts of its outer surface, and the collar adjacent its tapered holding portion is provided with internal complemental knurling areas which complemental knurling areas are generally axially directed and interengage with each other to provide a lock to preclude inadvertant or vibrational loosening of said collar.

References Cited

UNITED STATES PATENTS

| | | | |
|---|---|---|---|
| 1,377,355 | 5/1921 | Knapp | 248—288 |
| 2,694,813 | 11/1954 | Cartwright et al. | 248—223 |
| 2,820,885 | 1/1958 | Neugass | 287—116 |
| 3,120,369 | 2/1964 | Gray | 248—484X |
| 3,167,105 | 1/1965 | Rosan | 151—11 |

FOREIGN PATENTS

| | | | |
|---|---|---|---|
| 801,099 | 9/1958 | Great Britain | 248—475 |

ROY D. FRAZIER, Primary Examiner

F. DOMOTOR, Assistant Examiner

U.S. Cl. X.R.

151—11; 248—475; 287—116